United States Patent
Hakola et al.

(10) Patent No.: US 12,408,062 B2
(45) Date of Patent: Sep. 2, 2025

(54) GROUP BASED BEAM REPORTING

(71) Applicant: Nokia Technologies Oy, Espoo (FI)

(72) Inventors: Sami-Jukka Hakola, Kempele (FI); Mihai Enescu, Espoo (FI); Timo Koskela, Oulu (FI); Juha Pekka Karjalainen, Sotkamo (FI); Frederick Vook, Schaumburg, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 347 days.

(21) Appl. No.: 18/248,736

(22) PCT Filed: Oct. 13, 2021

(86) PCT No.: PCT/EP2021/078242
§ 371 (c)(1),
(2) Date: Apr. 12, 2023

(87) PCT Pub. No.: WO2022/084110
PCT Pub. Date: Apr. 28, 2022

(65) Prior Publication Data
US 2023/0403591 A1  Dec. 14, 2023

Related U.S. Application Data

(60) Provisional application No. 63/104,085, filed on Oct. 22, 2020.

(51) Int. Cl.
*H04W 24/10* (2009.01)
*H04W 24/08* (2009.01)
(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

2019/0306924 A1 * 10/2019 Zhang ................. H04B 7/063
2020/0059290 A1    2/2020 Pan et al.
2020/0059921 A1    2/2020 Karjalainen et al.
(Continued)

FOREIGN PATENT DOCUMENTS

WO     2018/202197 A1    11/2018

OTHER PUBLICATIONS

Office Action received for corresponding Japanese Patent Application No. 2023-524578, dated May 20, 2024, 6 pages of Office Action and 12 pages of summary and translation available.
(Continued)

*Primary Examiner* — Clemence S Han
(74) *Attorney, Agent, or Firm* — Lippes Mathias LLP

(57) ABSTRACT

According to an example aspect of the present disclosure, there is provided a method comprising receiving a message at a user equipment (UE) from a base station (BS) the message including a constraint threshold, receiving a message at the UE from the BS the message including a fallback beam reporting mode, performing by the UE downlink (DL) reference signal (RS) measurements, determining by the UE a difference between DL RS measurements, and in response to determining the difference between DL RS measurements is not less than the constraint threshold switch to the fallback beam reporting mode.

20 Claims, 11 Drawing Sheets

(56) References Cited

U.S. PATENT DOCUMENTS

| | | | | |
|---|---|---|---|---|
| 2020/0067590 | A1* | 2/2020 | Wang | H04W 52/365 |
| 2021/0084669 | A1* | 3/2021 | Mondal | H04L 5/0032 |
| 2021/0184733 | A1* | 6/2021 | Cao | H04B 7/0639 |
| 2021/0194658 | A1* | 6/2021 | Venugopal | H04W 76/27 |
| 2022/0086941 | A1* | 3/2022 | Huang | H04W 72/21 |
| 2022/0095254 | A1* | 3/2022 | Zhu | H04L 5/0094 |
| 2022/0123817 | A1* | 4/2022 | Karjalainen | H04B 7/063 |
| 2022/0330069 | A1* | 10/2022 | Zhang | H04B 7/088 |
| 2023/0081169 | A1* | 3/2023 | Matsumura | H04B 7/06952 370/329 |
| 2023/0085046 | A1* | 3/2023 | Kim | H04B 17/318 370/329 |

OTHER PUBLICATIONS

"On procedures for beam selection and feedback signalling", 3GPP TSG-RAN WG1#87, R1-1612862, Agenda item: 7.1.3.3, Nokia, Nov. 14-18, 2016, 6 pages.

"Enhancements on Beam Management for Multi-TRP/Panel Transmission", 3GPP TSG RAN WG1 #102-e, R1-2006846, Agenda item: 8.1.2.3, Nokia, Aug. 17-28, 2020, 8 pages.

"Enhancements on Beam Management for Multi-TRP/Panel Transmission", 3GPP TSG RAN WG1 #103-e Meeting, R1-2008906, Agenda item: 8.1.2.3, Nokia, Oct. 26-Nov. 13, 2020, 11 pages.

"3rd Generation Partnership Project; Technical Specification Group Radio Access Network; NR; Physical layer procedures for data (Release 16)", 3GPP TS 38.214, V16.2.0, Jun. 2020, pp. 1-163.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

Ngok Ruyue Li et al., "Beam Management in Millimeter-Wave Communications for 5G and Beyond", IEEE Access, vol. 8, Jan. 1, 2020, pp. 13282-13293.

International Search Report and Written Opinion received for corresponding Patent Cooperation Treaty Application No. PCT/EP2021/078242, dated Feb. 2, 2022, 16 pages.

Kaikkonen et al., "Main Radio Interface Related System Procedures", John Wiley & Sons, 2020, pp. 261-396.

"Enhancements on Beam Management for Multi-TRP/Panel Transmission", 3GPP TSG RAN WG1 #104-bis-e, R1-2103368, Agenda: 8.1.2.3, Nokia, Apr. 12-20, 2021, 13 pages.

"Enhancements on beam management for multi-TRP", 3GPP TSG RAN WG1 #102, R1-2006131, Agenda: 8.1.2.3, Samsung, Aug. 17-28, 2020, 4 pages.

* cited by examiner

GROUP BASED BEAM REPORTING

RELATED APPLICATION

This application claims priority to PCT Application No. PCT/EP2021/078242, filed on Oct. 13, 2021, which claims priority to U.S. Provisional Application No. 63/104,085, filed on Oct. 22, 2020, each of which is incorporated herein by reference in its entirety.

TECHNICAL FIELD

This description relates to beam management in wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving a message at a user equipment (UE), from a base station (BS), the message including a constraint threshold, receiving a message at the UE, from the BS, the message including a fallback beam reporting mode, performing, by the UE, downlink (DL) reference signal (RS) measurements, determining, by the UE, a difference between DL RS measurements, and in response to determining the difference between DL RS measurements is not less than the constraint threshold, switch to the fallback beam reporting mode.

Implementations can include one or more of the following features, alone, or in any combination with each other. The method can further include determining the N best DL RS based on at least one of the DL RS measurements and the difference between DL RS measurements and communicating a message including the N best DL RS from the UE to the BS. The method can further include in response to determining the difference between DL RS measurements is not less than the constraint threshold, monitor the difference between DL RS measurements. The method can further include in response to determining the difference between DL RS measurements is not less than the constraint threshold, terminate processing. The method can further include after switching to the fallback beam reporting mode, monitoring the difference between DL RS measurements, in response to determining the difference between DL RS measurements is less than the constraint threshold, switch to an enhanced group-based beam reporting mode, and monitor the difference between DL RS measurements.

The method can further include after switching to the fallback beam reporting mode, monitoring the difference between DL RS measurements, in response to determining the difference between DL RS measurements is less than the constraint threshold, switch to an enhanced group-based beam reporting mode, and terminate processing. The monitoring of the difference between DL RS measurements can be performed N times. The monitoring of the difference between DL RS measurements can be performed N times in a time window. The performing of the DL RS measurements and the determining of the difference between DL RS measurements can be performed N times before switching to the enhanced group-based beam reporting mode. The performing of the DL RS measurements and the determining of the difference between DL RS measurements can be performed N times in a time window before switching to the enhanced group-based beam reporting mode. The difference between DL RS measurements can be less than the constraint threshold N times. The method can further include before switching to the enhanced group-based beam reporting mode, switching to a basic beam group-based reporting mode.

The DL RS measurements a can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The method further includes performing a layer 1 handover between a first cell and a second cell. The BS can include two or more TRPs.

According to an example embodiment, a non-transitory computer-readable storage medium comprising instructions stored thereon that, when executed by at least one processor, are configured to cause a computing system to perform steps including receiving a message at a user equipment (UE), from a base station (BS), the message including a constraint threshold, receiving a message at the UE, from the BS, the message including a fallback beam reporting mode, performing, by the UE, downlink (DL) reference signal (RS) measurements, determining, by the UE, a difference between DL RS measurements, and in response to determining the difference between DL RS measurements is less than the constraint threshold, switch to an enhanced group-based beam reporting mode.

Implementations can include one or more of the following features, alone, or in any combination with each other. The steps can further include determining the N best DL RS based on at least one of the DL RS measurements and the difference between DL RS measurements and communicating a message including the N best DL RS from the UE to the BS. The steps can further include in response to determining the difference between DL RS measurements is not less than the constraint threshold, monitor the difference between DL RS measurements. The steps can further include in response to determining the difference between DL RS measurements is not less than the constraint threshold, terminate processing. The steps can further include after switching to the fallback beam reporting mode, monitoring the difference between DL RS measurements, in response to determining the difference between DL RS measurements is less than the constraint threshold, switch to an enhanced group-based beam reporting mode, and monitor the difference between DL RS measurements.

The steps can further include after switching to the fallback beam reporting mode, monitoring the difference between DL RS measurements, in response to determining the difference between DL RS measurements is less than the constraint threshold, switch to an enhanced group-based beam reporting mode, and terminate processing. The monitoring of the difference between DL RS measurements can be performed N times. The monitoring of the difference between DL RS measurements can be performed N times in a time window. The performing of the DL RS measurements and the determining of the difference between DL RS measurements can be performed N times before switching to the enhanced group-based beam reporting mode. The performing of the DL RS measurements and the determining of the difference between DL RS measurements can be performed N times in a time window before switching to the enhanced group-based beam reporting mode.

The difference between DL RS measurements can be less than the constraint threshold N times. The steps can further include before switching to the enhanced group-based beam reporting mode, switching to a basic beam group-based reporting mode. The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The steps further include performing a layer 1 handover between a first cell and a second cell. The BS can include two or more TRPs.

According to an example embodiment, an apparatus includes means for receiving a message at a user equipment (UE), from a base station (BS), the message including a constraint threshold, means for receiving a message at the UE, from the BS, the message including a fallback beam reporting mode, means for performing, by the UE, downlink (DL) reference signal (RS) measurements, means for determining, by the UE, a difference between DL RS measurements, and in response to determining the difference between DL RS measurements is less than the constraint threshold, means for switching to an enhanced group-based beam reporting mode.

Implementations can include one or more of the following features, alone, or in any combination with each other. The apparatus can further include means for determining the N best DL RS based on at least one of the DL RS measurements and the difference between DL RS measurements and means for communicating a message including the N best DL RS from the UE to the BS. The apparatus can further include in response to determining the difference between DL RS measurements is not less than the constraint threshold, means for monitoring the difference between DL RS measurements. The apparatus can further include in response to determining the difference between DL RS measurements is not less than the constraint threshold, means for terminating processing.

The apparatus can further include after switching to the fallback beam reporting mode, means for monitoring the difference between DL RS measurements, in response to determining the difference between DL RS measurements is less than the constraint threshold, means for switching to an enhanced group-based beam reporting mode, and means for monitoring the difference between DL RS measurements. The apparatus can further include after switching to the fallback beam reporting mode, means for monitoring the difference between DL RS measurements, in response to determining the difference between DL RS measurements is less than the constraint threshold, means for switching an enhanced group-based beam reporting mode, and terminate processing. The monitoring of the difference between DL RS measurements can be performed N times. The monitoring of the difference between DL RS measurements can be performed N times in a time window. The performing of the DL RS measurements and the determining of the difference between DL RS measurements can be performed N times before switching to the enhanced group-based beam reporting mode. The performing of the DL RS measurements and the determining of the difference between DL RS measurements can be performed N times in a time window before switching to the enhanced group-based beam reporting mode. The difference between DL RS measurements can be less than the constraint threshold N times. The apparatus can further include before switching to the enhanced group-based beam reporting mode, means for switching to a basic beam group-based reporting mode.

The DL RS measurements a can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The apparatus further includes performing a layer 1 handover between a first cell and a second cell. The BS can include two or more TRPs.

According to an example embodiment, an apparatus includes at least one processor and at least one memory including computer program code, the at least one memory and the computer program code configured to, with the at least one processor, cause the apparatus at least to perform the steps including receiving a message at a user equipment (UE), from a base station (BS), the message including a constraint threshold, receiving a message at the UE, from the BS, the message including a fallback beam reporting mode, performing, by the UE, downlink (DL) reference signal (RS) measurements, determining, by the UE, a difference between DL RS measurements, and in response to determining the difference between DL RS measurements is less than the constraint threshold, switch to an enhanced group-based beam reporting mode.

Implementations can include one or more of the following features, alone, or in any combination with each other. The steps can further include determining the N best DL RS based on at least one of the DL RS measurements and the difference between DL RS measurements and communicating a message including the N best DL RS from the UE to the BS. The steps can further include in response to determining the difference between DL RS measurements is not less than the constraint threshold, monitor the difference between DL RS measurements. The steps can further include in response to determining the difference between DL RS measurements is not less than the constraint threshold, terminate processing.

The steps can further include after switching to the fallback beam reporting mode, monitoring the difference between DL RS measurements, in response to determining the difference between DL RS measurements is less than the constraint threshold, switch to an enhanced group-based beam reporting mode, and monitor the difference between DL RS measurements. The steps can further include after switching to the fallback beam reporting mode, monitoring the difference between DL RS measurements, in response to determining the difference between DL RS measurements is less than the constraint threshold, switch to an enhanced group-based beam reporting mode, and terminate processing. The monitoring of the difference between DL RS measurements can be performed N times. The monitoring of the difference between DL RS measurements can be performed N times in a time window. The performing of the DL RS measurements and the determining of the difference between DL RS measurements can be performed N times before switching to the enhanced group-based beam reporting mode. The performing of the DL RS measurements and the determining of the difference between DL RS measurements can be performed N times in a time window before switching to the enhanced group-based beam reporting mode.

The difference between DL RS measurements can be less than the constraint threshold N times. The steps can further include before switching to the enhanced group-based beam reporting mode, switching to a basic beam group-based reporting mode. The DL RS measurements a can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The steps further include performing a layer 1 handover between a first cell and a second cell. The BS can include two or more TRPs.

According to an example embodiment, a method may include communicating a message from a base station (BS) to a user equipment, the message including a constraint threshold, communicating a message from the BS to the UE, the message including a fallback beam reporting mode, receiving a message at the BS, from the UE, the message including the N best downlink (DL) reference signal (RS) measurements associated with the UE, and determining, by the BS, a group-based beam reporting mode based on the DL RS measurements.

Implementations can include one or more of the following features, alone, or in any combination with each other. The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and are a measurement of a RSRP from a second TRP at a second panel of the UE. The first TRP and the second TRP can be located in the same cell. The first TRP can be located in a first cell and the second TRP can be located in a second cell. The determined group-based beam reporting mode can be a group-based beam reporting mode. The fallback beam reporting mode can be a basic group-based beam reporting mode.

According to an example embodiment, a non-transitory computer-readable storage medium comprising instructions stored thereon that, when executed by at least one processor, are configured to cause a computing system to perform steps including communicating a message from a base station (BS) to a user equipment, the message including a constraint threshold, communicating a message from the BS to the UE, the message including a fallback beam reporting mode, receiving a message at the BS, from the UE, the message including the N best downlink (DL) reference signal (RS) measurements associated with the UE, and determining a group-based beam reporting mode based on the DL RS measurements.

Implementations can include one or more of the following features, alone, or in any combination with each other. The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and are a measurement of a RSRP from a second TRP at a second panel of the UE. The first TRP and the second TRP can be located in the same cell. The first TRP can be located in a first cell and the second TRP can be located in a second cell. The determined group-based beam reporting mode can be a group-based beam reporting mode. The fallback beam reporting mode can be a basic group-based beam reporting mode.

According to an example embodiment, an apparatus includes means for communicating a message from a base station (BS) to a user equipment, the message including a constraint threshold, means for communicating a message from the BS to the UE, the message including a fallback beam reporting mode, means for receiving a message at the BS, from the UE, the message including the N best downlink (DL) reference signal (RS) measurements associated with the UE, and means for determining, by the BS, a group-based beam reporting mode based on the DL RS measurements.

Implementations can include one or more of the following features, alone, or in any combination with each other. The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and are a measurement of a RSRP from a second TRP at a second panel of the UE. The first TRP and the second TRP can be located in the same cell. The first TRP can be located in a first cell and the second TRP can be located in a second cell. The determined group-based beam reporting mode can be a group-based beam reporting mode. The fallback beam reporting mode can be a basic group-based beam reporting mode.

According to an example embodiment, an apparatus includes at least one processor, and at least one memory including computer program code, the at least one memory and the computer program code configured to, with the at least one processor, cause the apparatus at least to perform the steps including communicating a message from a base station (BS) to a user equipment, the message including a constraint threshold, communicating a message from the BS to the UE, the message including a fallback beam reporting mode, receiving a message at the BS, from the UE, the message including the N best downlink (DL) reference signal (RS) measurements associated with the UE, and determining, by the BS, a group-based beam reporting mode based on the DL RS measurements.

Implementations can include one or more of the following features, alone, or in any combination with each other. The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and are a measurement of a RSRP from a second TRP at a second panel of the UE. The first TRP and the second TRP can be located in the same cell. The first TRP can be located in a first cell and the second TRP can be located in a second cell. The determined group-based beam reporting mode can be a group-based beam reporting mode. The fallback beam reporting mode can be a basic group-based beam reporting mode.

According to an example embodiment, a method may include receiving a message at a user equipment (UE), from a base station (BS), the message including a constraint threshold, receiving a message at the UE, from the BS, the message including a fallback beam reporting mode, performing, by the UE, downlink (DL) reference signal (RS) measurements, determining, by the UE, a difference between DL RS measurements, and in response to determining the difference between DL RS measurements is less than the constraint threshold, switch to an enhanced group-based beam reporting mode.

Implementations can include one or more of the following features, alone, or in any combination with each other. The method can further include determining the N best DL RS based on at least one of the DL RS measurements and the difference between DL RS measurements and communicating a message including the N best DL RS from the UE to the BS. The method can further include in response to determining the difference between DL RS measurements is not less than the constraint threshold, monitor the difference between DL RS measurements. The method can further include in response to determining the difference between DL RS measurements is not less than the constraint threshold, terminate processing. The method can further include before performing DL RS measurements, switching to the fallback beam reporting mode.

The performing of the DL RS measurements and the determining of the difference between DL RS measurements can be performed N times. The performing of the DL RS measurements and the determining of the difference between DL RS measurements can be performed N times in a time window. The difference between DL RS measurements can be less than the constraint threshold N times.

The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The method can further include performing a layer 1 handover between a first cell and a second cell. The BS can include two or more TRPs.

According to an example embodiment, a non-transitory computer-readable storage medium comprising instructions stored thereon that, when executed by at least one processor, are configured to cause a computing system to perform the steps including receiving a message at a user equipment (UE), from a base station (BS), the message including a constraint threshold, receiving a message at the UE, from the BS, the message including a fallback beam reporting mode, performing, by the UE, downlink (DL) reference signal (RS) measurements, determining, by the UE, a difference between DL RS measurements, and in response to determining the difference between DL RS measurements is less than the constraint threshold, switch to an enhanced group-based beam reporting mode.

Implementations can include one or more of the following features, alone, or in any combination with each other. The steps can further include determining the N best DL RS based on at least one of the DL RS measurements and the difference between DL RS measurements and communicating a message including the N best DL RS from the UE to the BS. The steps can further include in response to determining the difference between DL RS measurements is not less than the constraint threshold, monitor the difference between DL RS measurements.

The steps can further include in response to determining the difference between DL RS measurements is not less than the constraint threshold, terminate processing. The steps can further include before performing DL RS measurements, switching to the fallback beam reporting mode. The performing of the DL RS measurements and the determining of the difference between DL RS measurements can be performed N times. The performing of the DL RS measurements and the determining of the difference between DL RS measurements can be performed N times in a time window.

The difference between DL RS measurements can be less than the constraint threshold N times. The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The steps can further include performing a layer 1 handover between a first cell and a second cell. The BS can include two or more TRPs.

According to an example embodiment, an apparatus includes means for receiving a message at a user equipment (UE), from a base station (BS), the message including a constraint threshold, means for receiving a message at the UE, from the BS, the message including a fallback beam reporting mode, means for performing, by the UE, downlink (DL) reference signal (RS) measurements, means for determining, by the UE, a difference between DL RS measurements, and in response to determining the difference between DL RS measurements is less than the constraint threshold, means for switching to an enhanced group-based beam reporting mode.

Implementations can include one or more of the following features, alone, or in any combination with each other. The apparatus can further include means for determining the N best DL RS based on at least one of the DL RS measurements and the difference between DL RS measurements and communicating a message including the N best DL RS from the UE to the BS. The apparatus can further include in response to determining the difference between DL RS measurements is not less than the constraint threshold, means for monitoring the difference between DL RS measurements. The apparatus can further include in response to determining the difference between DL RS measurements is not less than the constraint threshold, means for terminating processing.

The apparatus can further include before performing DL RS measurements, means for switching to the fallback beam reporting mode. The performing of the DL RS measurements and the determining of the difference between DL RS measurements can be performed N times. The performing of the DL RS measurements and the determining of the difference between DL RS measurements can be performed N times in a time window. The difference between DL RS measurements can be less than the constraint threshold N times.

The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The apparatus can further include means for performing a layer 1 handover between a first cell and a second cell. The BS can include two or more TRPs.

According to an example embodiment, an apparatus including at least one processor and at least one memory including computer program code, the at least one memory and the computer program code configured to, with the at least one processor, cause the apparatus at least to perform the steps including receiving a message at a user equipment (UE), from a base station (BS), the message including a constraint threshold, receiving a message at the UE, from the BS, the message including a fallback beam reporting mode, performing, by the UE, downlink (DL) reference signal (RS) measurements, determining, by the UE, a difference between DL RS measurements, and in response to determining the difference between DL RS measurements is less than the constraint threshold, switch to an enhanced group-based beam reporting mode.

Implementations can include one or more of the following features, alone, or in any combination with each other. The steps can further include determining the N best DL RS based on at least one of the DL RS measurements and the difference between DL RS measurements and communicating a message including the N best DL RS from the UE to the BS. The steps can further include in response to determining the difference between DL RS measurements is not less than the constraint threshold, monitor the difference between DL RS measurements. The steps can further include in response to determining the difference between DL RS measurements is not less than the constraint threshold, terminate processing.

The steps can further include before performing DL RS measurements, switching to the fallback beam reporting mode. The performing of the DL RS measurements and the determining of the difference between DL RS measurements can be performed N times. The performing of the DL RS measurements and the determining of the difference between DL RS measurements can be performed N times in a time window. The difference between DL RS measurements can be less than the constraint threshold N times.

The DL RS measurements can be measurements of a reference signal received power (RSRP) of two or more transmission and reception points (TRPs). The DL RS measurements can be measurements of a RSRP at different panels of the UE. The DL RS measurements can be a measurement of a RSRP from a first TRP at a first panel of the UE and can be a measurement of a RSRP from a second TRP at a second panel of the UE. The first TRP and the second TRP can be located in the same cell. The first TRP can be located in a first cell and the second TRP can be located in a second cell. The steps can further include performing a layer 1 handover between a first cell and a second cell. The BS can include two or more TRPs.

The details of one or more examples of embodiments are set forth in the accompanying drawings and the description below. Other features will be apparent from the description and drawings, and from the claims.

DETAILED DESCRIPTION

Figure 1:
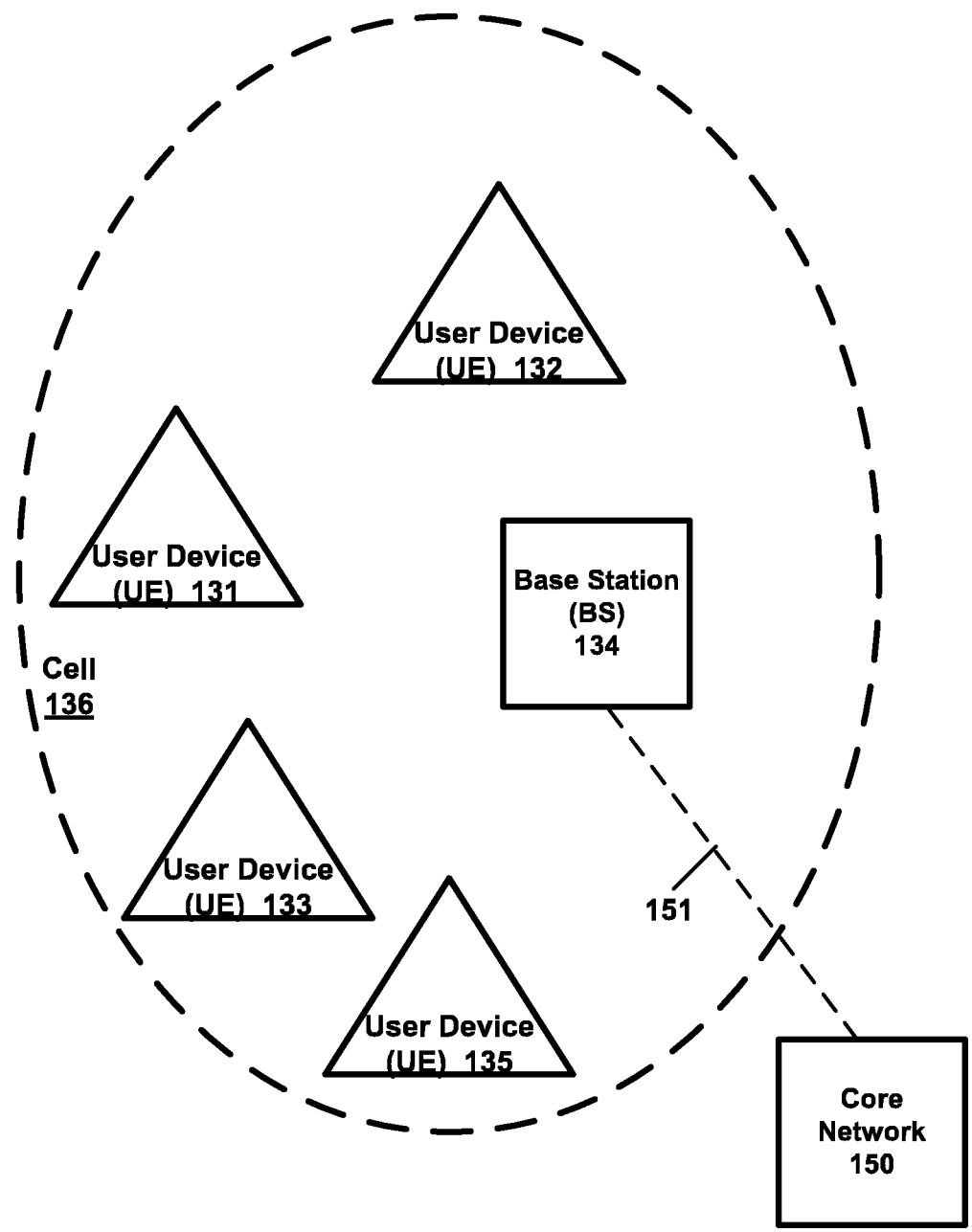
FIG. 1 is a block diagram of a wireless network according to at least one example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

Figure 2A:
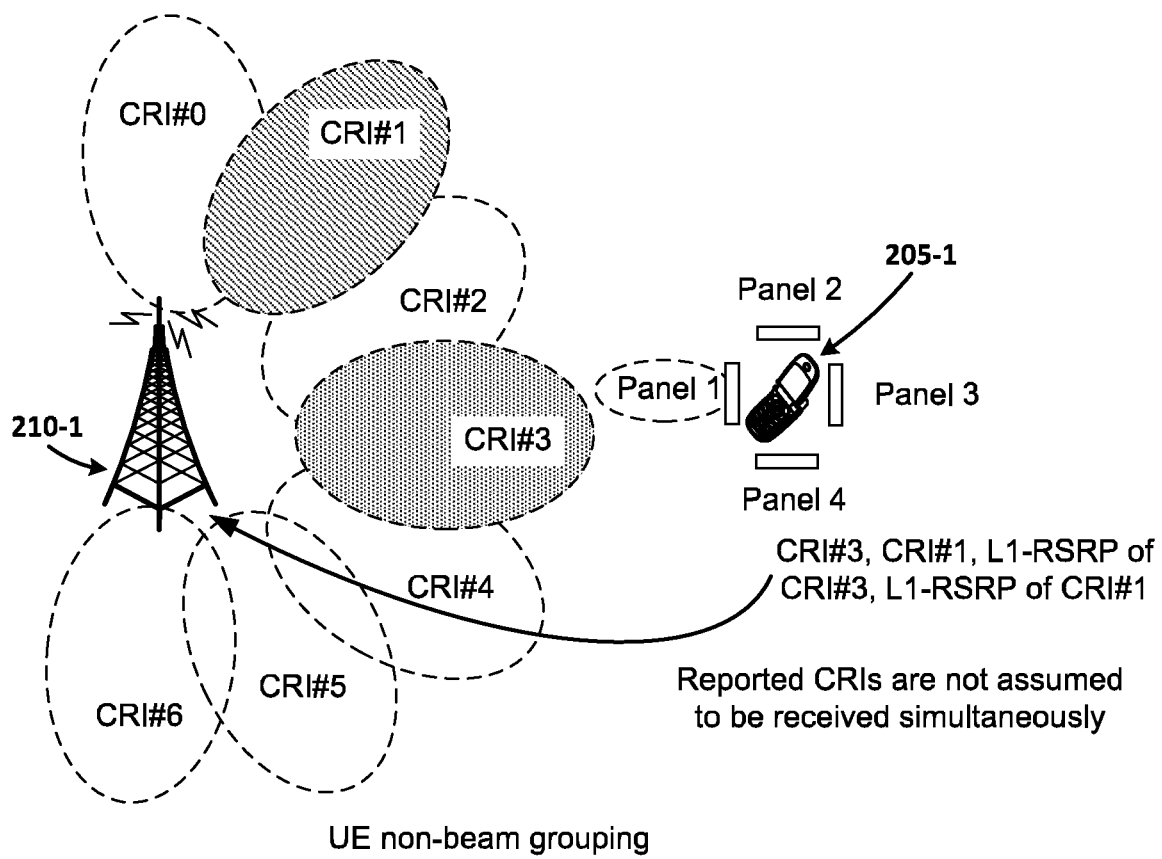
FIG. 2A illustrates a diagram of non-beam group-based reporting with non-zero-power channel state information reference signal resources according to at least one example embodiment.

Beam management includes a set of procedures used to search, allocate and control beam pair links between gNB and UE. One of the core functionalities is the UE reporting of which downlink (DL) reference signal(s) (RS) are feasible to be used as spatial sources for downlink and uplink beam selection. FIG. 2A illustrates an example of non-beam group-based reporting with non-zero-power channel state information reference signal (NZP-CSI-RS) resources. As shown in FIG. 2A, a network can include a user equipment (UE) 205-1, a base station (BS) 210-1 (e.g., a gNB, TRP, and the like), and at least one configure channel state information (CSI) resource indicator (CRI) CRI #0, CRI #1, CRI #2, CRI #3, CRI #4, CRI #5, CRI #6. The UE 205-1 can include at least one antenna panel 1, panel 2, panel 3, panel 4 configured to generate a beam. The Network can configure CSI reporting with up to four CRIs with layer 1 (physical layer) reference signal received power (L1-RSRP) values to be reported. In FIG. 2A, only two CRIs are shown (CRI #1 and CRI #3 (shaded grey)) when the network configures beam reporting to be non-group-based reporting, and the UE is not assumed to receive simultaneously the reported CRIs associated with the L1-RSRP values. When TX beam switch occurs among reported CRIs, some extra time needs to be reserved to enable the UE to change it RX beam and/or antenna panel accordingly. As a result, the scheduling flexibility of the network may be limited when using non-beam group-based reporting, and the beam group-based reporting can be used instead.

Figure 2B:
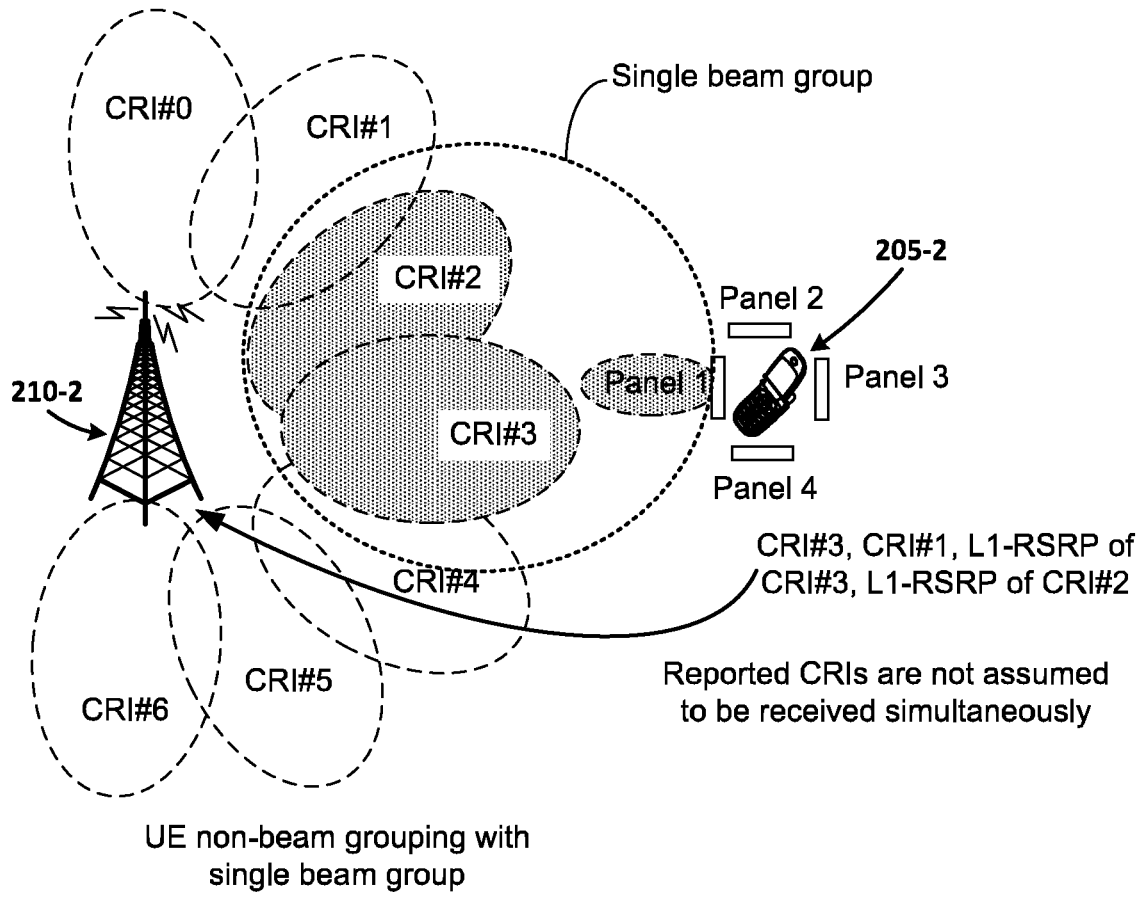
FIG. 2B illustrates a diagram of beam group-based reporting with non-zero-power channel state information reference signal resources with a single UE beam group according to at least one example embodiment.

FIG. 2B illustrates an example of beam group-based reporting with NZP-CSI-RS resources with a single UE beam group. As shown in FIG. 2B, a network can include a user equipment (UE) 205-2, a base station (BS) 210-2 (e.g., a gNB, a TRP, and the like), and at least one configure channel state information (CSI) resource indicator (CRI) CRI #0, CRI #1, CRI #2, CRI #3, CRI #4, CRI #5, CRI #6. The UE 205-1 can include at least one antenna panel 1, panel 2, panel 3, panel 4 configured to generate a beam.

When a single beam group is configured, the UE can be assumed to receive simultaneously up to four CRIs. In FIG. 2B, only two CRIs (CRI #2 and CRI #3 (shaded grey)) are shown in the single beam group. Multiple CRIs can be received with a single UE beam group. Therefore, no extra time needs to be reserved when a TX beam change occurs within the beam group. As a result, the scheduling restrictions of a network can be reduced.

Figure 2C:
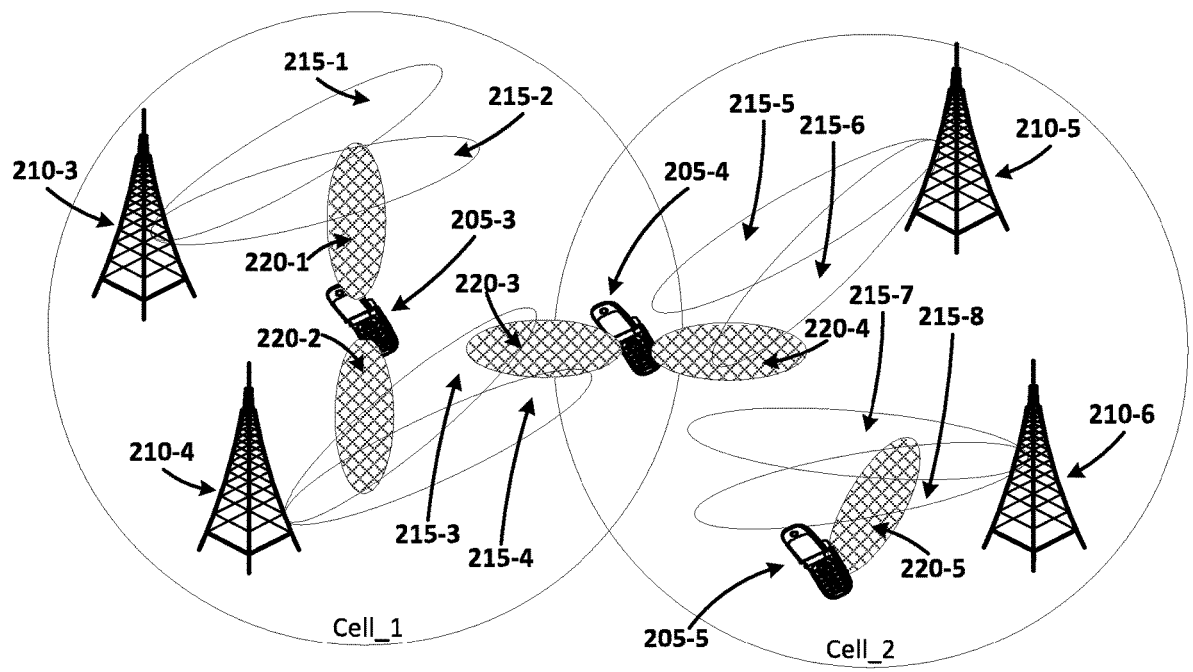
FIG. 2C illustrates a diagram of UE beam group-based reporting selection according to at least one example embodiment.

FIG. 2C shows a diagram of UE beam group-based reporting selection according to at least one example embodiment. As shown in FIG. 2C, the network includes two cells cell_1 and cell_2. Cell cell_1 includes UE 205-3, UE 205-4, BS 210-3, and BS 210-4. UE 205-3 can generate beam 220-1 and beam 220-2. UE 205-4 can generate beam 220-3 and beam 220-4. BS 210-3 can generate CRI 215-1 and CRI 215-2. BS 210-4 can generate CRI 215-3 and CRI 215-4. Cell cell_2 includes UE 205-4, UE 205-5, BS 210-5, and BS 210-6. UE 205-4 can generate beam 220-3 and beam 220-4. UE 205-5 can generate beam 220-5. BS 210-5 can generate CRI 215-5 and CRI 215-6. BS 210-6 can generate CRI 215-7 and CRI 215-8.

A cell can include two or more BS each with two or more TRPs. Therefore, in an example implementation, a UE operating within the cell can receive DL reference signals from the two or more TRP's. Further, at least two cells can cover an overlapping geographic region. Therefore, in an example implementation, a UE operating within the overlapping geographic region can receive DL reference signals from a TRP associated with the first cell and from a TRP associated with the second cell.

As shown in FIG. 2C, UE 205-5 is located within cell cell_2 and within range of BS 210-6. UE 205-5 is only within the range of one TRP, therefore UE 205-5 can be configured for reporting as described above with regard to FIGS. 2A and 2B with the single BS and/or TRP. As shown in FIG. 2C, UE 205-3 is located within cell cell_1 and within range of BS 210-3 and BS 210-4. UE 205-3 can be configured for reporting as described above with regard to FIGS. 2A and 2B. However, UE 205-3 is within the range of more than one TRP using more than one antenna (or panel). Therefore, UE 205-3 can also be configured for reporting (e.g., group reporting) with CRI's from two (or more) TRPs. As shown in FIG. 2C, UE 205-4 is located within cell cell_1 and cell cell_2 and within range of BS 210-4 and BS 210-5. UE 205-4 can be configured for reporting as described above with regard to FIGS. 2A and 2B. However, UE 205-4 is within the range of more than one TRP in more than one cell using more than one antenna (or panel). Therefore, UE 205-4 can also be configured for reporting (e.g., group reporting) with CRI's from two (or more) TRPs in two (or more) cells.

Group-based beam reporting can be used to provide a transmission and reception point (TRP) (e.g., BS, gNB, and the like) with information indicating which DL reference signal(s) (RS) the UE can receive simultaneously, i.e., to provide flexibility for the TRP to select TX beams among the UEs. Existing techniques cannot provide support for the possibility of higher rank transmission in a multi-TRP scenario. In other words, the UE selecting preferred DL RSs that are transmitted from different TRPs and that are received using different RX panels at the UE (e.g., without significant inter-beam interference).

When group based beam reporting is configured in Rel-15, the single group-based beam reporting instance does not explicitly indicate for a network whether reported N-resources (i.e. SSB or NZP-CSI-RS) can be received simultaneously at UE-side with multiple spatial filters or single spatial filter. For group-based beam reporting for multi-TRP, it is expected that multiple spatial filters are used by the UE and reporting should indicate the capability of simultaneous reception, not any other grouping that might see by the UE on switching certain beams. Also, the network may wish effectively utilize beam group reports to schedule simultaneous multi-beam DL transmission in single or multi-TRP scenario. To avoid the ambiguity problem associated with the group-based beam reporting, the network may configure criteria associated with group-based reporting defining simultaneous reception for N-resources to be 'ON/OFF". When the simultaneous reception criteria is configured to be 'ON', the UE shall only report N-different CSI resources (i.e. NZP-CSI-RS or SSB) that can be simultaneously received with multiple different spatial filters with spatial multiplexing capability. When the simultaneous reception criteria is configured to be 'OFF', the UE shall only report N-different resources simultaneously received with a one (or more) spatial filter considering with beam switching capability.

There is a need for enhancing group-based beam reporting so that the UE can report DL RSs that the UE can receive from different TRPs using different RX panels at the UE. Enhancing group-based beam reporting may be established by defining new rules and/or constraints for the measurements and reporting as well as categorizing DL RSs to different TRPs.

When a UE is configured with a new enhanced group-based beam reporting with rules/constraints requiring the UE to provide a beam report with resources of RSs from different TRPs, there are likely situations due to UE mobility (e.g., mobility within a cell) and rotation as well as operation with narrow beams where the UE detects RS resources assigned to one TRP that have a much stronger reference signal quality (e.g. in terms of received reference signal power (RSRP) or signal-to-noise-and-interference ratio (SINR)) than the RS resources associated with other TRP(s). Handover between cells is layer 3 (L3) procedure. However, UE mobility between cells can be performed using beam management, for example, using layer 1 (L1) and layer 2 (L2) procedures while cell change is not visible in L3 using the enhanced group-based beam reporting. Reporting based on the existing rules/constraints associated with reporting configuration can result in the UE reporting DL RS resource(s) from TRP(s) associated with poorer reference signal quality as well. Reporting TRP(s) with poorer reference signal quality may not optimal information for the TRP to efficiently schedule beam resources over time. If the UE does not determine DL RSs from different TRPs having feasible strength are within range, the UE can provide multiple RSs that the UE can receive simultaneously from a single TRP (e.g., according to basic group-based beam reporting mode).

Example implementations can include a mechanism to enable a UE to switch the UEs reporting mode under certain conditions/rules and for the UE to switch/fallback from a first reporting mode (e.g., the enhanced group based beam reporting) to a second reporting mode (e.g., basic group-based beam reporting or non-group based beam reporting). In the first reporting mode, the UE can determine that there is a larger reference signal quality difference than a configured threshold. The signal quality difference can be a difference between the strongest RS resource of a first TRP and the strongest RS resource of at least one second TRP among the RS resources configured for the beam measurement. The configured threshold and/or the used measurement quantity may be, for example, one of RSRP, SINR. The TRP specific RS can be indicated by, for example, the resource ID (NZP-CSI-RS/SSB) or resource set ID is configured with explicit TRP identifier. The TRP identifier may be a logical identifier (e.g. TRP1, TRP2, and so on) or the TRP identifier may be any identifier that associates a specific RS (DL RS) or set of RS with assumption that different TRP may be used for transmitting one or more of the configured RS. Further, different panels of one TRP can be differentiated with an identifier (e.g., a TRP identifier). Therefore, a panel at the TRP could be considered as single TRP in a multi-TRP use case.

In response to determining that the measured reference signal quality difference is greater or equal to the threshold (e.g. based on at least one L1-RSRP measurement or at least one measurement), the UE can switch to the second reporting mode. In an example implementation, the second reporting mode can be a basic group-based reporting mode or a non-group-based reporting mode. The second reporting mode can depend on the explicit configuration of the choice.

In at least one example implementation, the UE can switch the reporting mode in response to a measured reference signal quality difference based on at least one measurement or in response to a reported difference that is greater than the configured threshold value base on at least one reporting instance. In another (or alternative) example implementation, the UE can switch the reporting mode back to the first reporting mode (excluding reporting of reference signal quality difference) in response to the UE having measured the reference signal quality difference based on at least one measurement or in response to the UE having reported the difference less than the threshold based on at least one reporting instance.

In order to enable the network to control the reliability of reporting mode switching, a time-based and/or measurement-based monitoring window associated with reporting mode switch can be defined to encapsulate the UE procedure and time span of the window for the processing of reference signal quality and/or reference signal quality difference measurements or reported signal quality values. The length of monitoring window, N, (e.g. number of measurements) can be configured by the network, where N=1 can indicate a single measurement and so on. In another example, the UE can determine to switch the reporting mode after measuring the signal quality difference in N consecutive measurements or N measurements in a time window. These measurements can trigger change of reporting mode. The time can be, for example, a sliding window or a time window that starts whenever the UE has made a measurement and determined signal quality difference above/less than threshold.

In another example implementation, the UE can switch the reporting mode after providing N consecutive measurement reports or N measurement reports in a time window carrying measurements that would trigger a change of reporting mode. The time can be, for example, a sliding window or a time window starts whenever UE has provided a measurement report that reports signal quality difference above/less than threshold.

In another (alternative or additional) example implementation, the UE can be configured with the number of best RSs corresponding to different TRPs that should be within the configured threshold from the strongest one in order to report according to the first reporting mode (the number could be e.g. 2). Otherwise, the UE may switch to the second reporting mode. In yet another (alternative or additional) example implementation, in the first reporting mode, the UE can use a bitmap to indicate which N beams/RS resources are above the certain threshold. The UE can include the N RSRPs (or any other configured metric, e.g., SINR) in the report.

Figure 3:
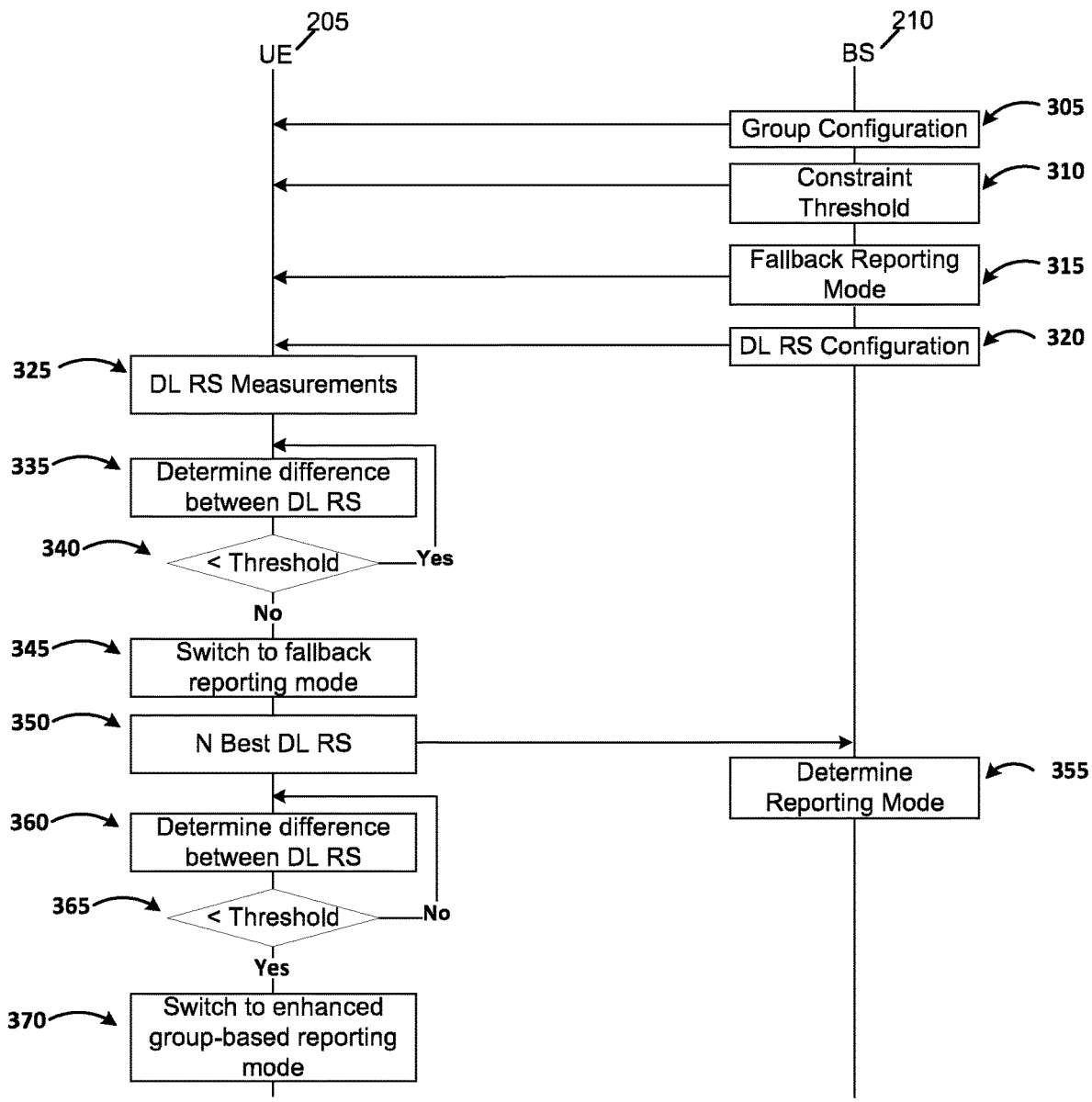
FIG. 3 is a block diagram of a signal flow according to at least one example embodiment.

FIG. 3 is a block diagram of a signal flow according to at least one example embodiment. A group configuration message (305) is sent by the BS 210 to the UE 205. The group configuration message can indicate that an enhance reporting mode can be used (e.g., if conditions exist). A message including a constraint threshold (310) is sent by the BS 210 to the UE 205. The constraint threshold can be based on RS strength (e.g., RSRP), strength delta between TRPs, and/or quality (e.g., SINR). A message including a fallback reporting mode (315) is sent by the BS 210 to the UE 205. The fallback reporting mode can be a reporting mode to be used by the UE should the enhanced mode not be used (e.g., conditions for use of the enhanced reporting mode do not exist). A downlink (DL) reference signal (RS) configuration message (320) is sent by the BS 210 to the UE 205. The DL RS configuration message can include measurement information for DL RSs that may be identified with an identifier reflecting certain TRP (identifier could be a logical identifier (gives network flexibility to separate e.g. different TX panels at the same TRP). Receipt of the DL RS configuration message can trigger the UE to begin an enhanced mode reporting process.

The UE 205 performs DL RS measurements (325). The DL RS measurements can be a reference signal received power (RSRP) measurement, a reference signal strength indicator (RSSI), signal-to-noise-and-interference ratio (SINR), and/or the like. The DL RS measurements can be associated with one or more TRP(s). The one or more TRP(s) can be associated with one or more cells. The DL RS can be associated with one or more panel(s) (or antenna) associated with the UE.

The UE 205 determines a difference between DL RS(s) (335). The difference can be a difference between the strongest RS resource of a first TRP and the strongest RS resource of at least one second TRP. The UE 205 compares (340) DL RS measurement difference to the constraint threshold. If the DL RS measurement difference is/are not less than the constraint threshold, the UE 205 switches (345) a reporting mode to a fallback group reporting mode. If the DL RS measurement difference is/are less than the constraint threshold, processing returns to 335. An N best DL RS message (350) is sent from the UE 205 to the BS 210. The N best DL RS message can be communicated to one or more TRP(s). The N best DL RS message can be associated with one or more TRP(s). The BS 210 determines the reporting mode (355). The TRP(s) can determine the reporting mode based on the enhanced group mode rules/constraints (e.g., using the constraint threshold). In an example implementation, the TRP(s) determine that the reporting mode is the same reporting mode as set by the UE.

The UE 205 determines a difference between DL RS(s) (360). The difference can be a difference between the strongest RS resource of a first TRP and the strongest RS resource of at least one second TRP. The UE 205 compares (365) DL RS measurement difference to the constraint threshold. If the DL RS measurement difference is/are less than the constraint threshold, the UE switches (370) the reporting mode to the enhanced group-based reporting mode. If the DL RS measurements are not less than the constraint threshold, processing returns to 360.

The TRP can stay synchronized with the UE's reporting mode because the TRP configures and categorizes the reference signals to be measured by earmarking each reference signal with a logical index representing TRP (or panel of the TRP). Determination at the TRP can include: if the TRP detects that the reported DL RSs are configured with different logical index the TRP determines that enhanced group based reporting is in use by the UE, else the TRP determines that basic-group reporting mode is in use by the UE.

There may be an information element in the beam report to further distinguish cases where the UE reports DL RSs corresponding to the different TRP(s) but that UE can either use multiple panels or DL RSs are received using a single panel. The TRP can determine the reporting mode based on the information element indicating the reporting mode in use.

Example implementations can enable a higher order of spatial multiplexing (higher rank) on the DL to a UE using two (or more) TRPs (e.g., enabling a rank that is higher than what would have been possible with only a single TRP). The thresholding on the difference between the two TRPs can be used to determine when it makes sense to use Multi-TRP transmission for the purpose of increasing the overall rank. One aspect of Multi-TRP transmission for providing higher rank transmission can be that a UE can acquire resources from a second TRP. The second set of resources could have been used instead for another UE that's attached to that second TRP. Therefore, the higher rank Multi-TRP transmission to a UE when multi-TRP transmission would provide network benefits. If a first TRP is stronger than the second TRP, then there may not be a significant benefit to giving that UE a second set of resources from a second TRP (regardless of what type of receiver the UE uses). Therefore, the use of thresholding can enable the UE to report the quantities appropriate to the expected transmission scheme. If the TRP difference is low, then the UE can report assuming two-TRP operation (e.g., the first reporting mode). If the TRP difference is high, then the UE can report assuming single-TRP operation (e.g., the second reporting mode).

Figure 4:
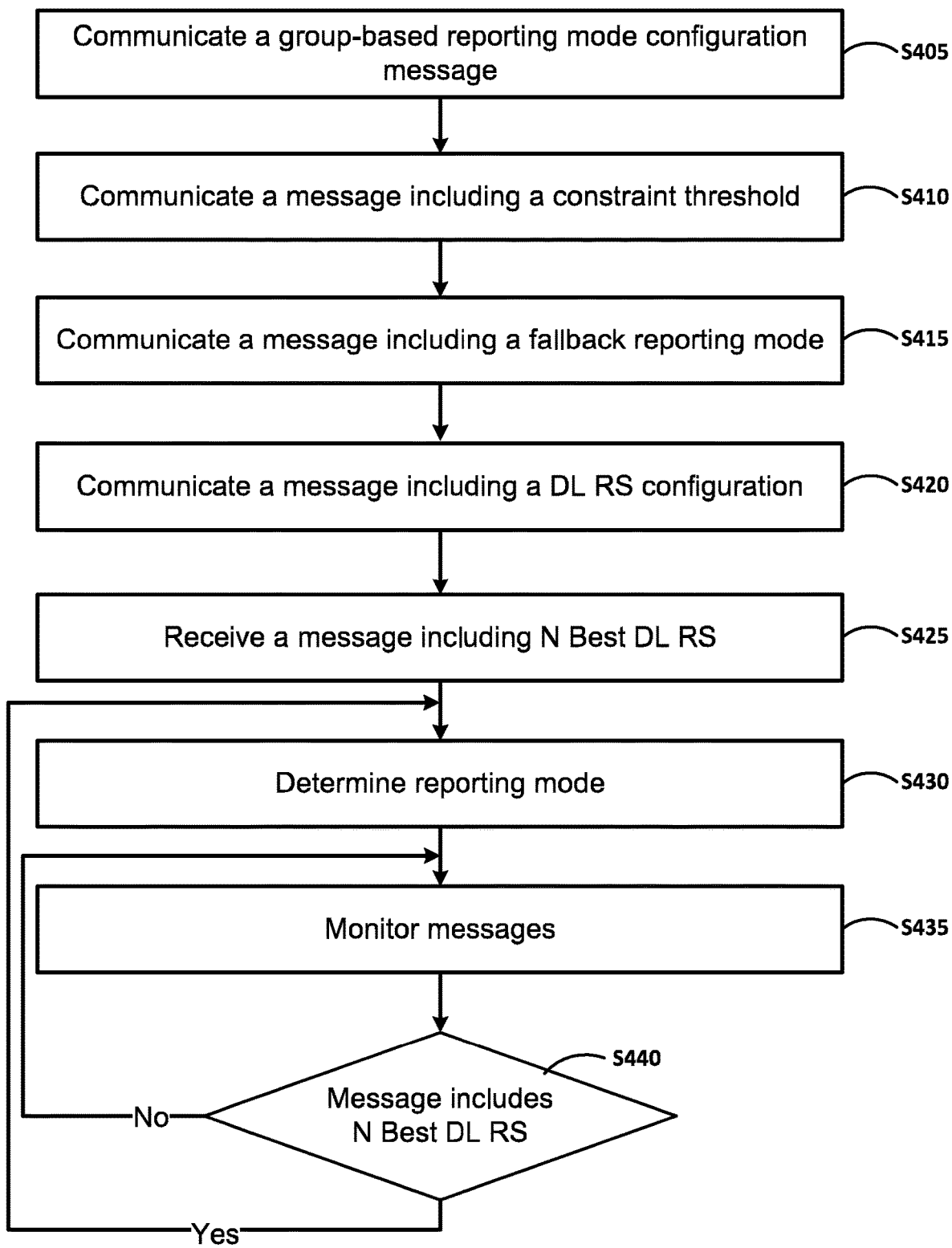
FIG. 4 illustrates a block diagram of a flow chart used by a base station (BS) in an enhanced reporting mode process according to at least one example embodiment.

FIG. 4 illustrates a block diagram of a method used by a TRP in an enhanced reporting mode process according to at least one example embodiment. As shown in FIG. 4, in step S405 a group-based reporting mode configuration message is communicated. For example, a message including group-based beam reporting configuration information can be communicate from a TRP (e.g., a gNB) to a UE. The message can be communicated using a physical downlink control channel (PDCCH) or a physical downlink data channel (PDSCH).

In step S410 a message including a constraint threshold is communicated. For example, message including a constraint threshold is communicated from the TRP to the UE. The enhanced group-based beam reporting may be established by defining new rules and/or constraints for the measurements and reporting as well as categorizing DL RS to different TRP(s). The constraint threshold can be a constraint for the measurements of DL RS. The measurement can be a RSRP measurement, a RSSI measurement, a SINR measurement, and/or the like. The constraint threshold can be associated with an RSRP (a RSSI, a SINR, and/or the like) difference between beams of at least one TRP. For example, the constraint threshold can be the difference between an RSRP measurement (e.g., an RSRP maximum) of a first TRP and an RSRP measurement (e.g., an RSRP maximum) of a second RSRP. The message can be communicated using a PDCCH or a PDSCH.

In step S415 a message including a fallback reporting mode is communicated. For example, a message indicating a fallback reporting mode as basic group-based beam reporting can be communicated from the TRP to the UE. The message can be communicated using a PDCCH or a PDSCH.

In step S420 a message including a DL RS configuration is communicated. For example, the message can be communicated from the TRP to the UE. The DL RS configuration message can include measurement information for DL RSs that may be identified with an identifier of the TRP. The identifier could be a logical identifier (e.g., gives network flexibility to separate e.g. different TX panels at the same TRP). The message can be communicated using a PDCCH or a PDSCH.

In step S425 a message including N best DL RS is received. For example, the message can be received from the UE. The N best DL RS message can be associated with one or more TRP(s). The N best DL RS message can indicate the best (e.g., that meet a criterion (e.g., minimum RSRP)) DL RS of at least one TRP. The N best DL RS message can include an identifier of at least one TRP. The N best DL RS message can include RSRP, RSSI, SINR, and/or the like information. The message can be communicated using a PUCCH or a PUSCH.

In step S430 a reporting mode is determined. For example, the TRP can determine the beam reporting mode based on the rules and/or constraints associated with the enhanced group-based beam reporting. For example, if the N best DL RS message includes information indicating the DL RS information meets the standards of the rules and/or constraints to use enhanced group-based beam reporting, the reporting mode can be determined as enhanced group-based beam reporting. Otherwise, the reporting mode can be determined as basic group-based beam reporting. For example, if the N best DL RS message includes the identifier of two or more TRP(s), the reporting mode can be determined as enhanced group-based beam reporting.

In step S435 messages are monitored. For example, messages received by the TRP using the PUCCH or a PUSCH can be monitored. If in step S440 a message is a N best DL RS message, processing returns to step S430. Otherwise, processing returns to step SS435 to continue monitoring messages.

Figure 5:
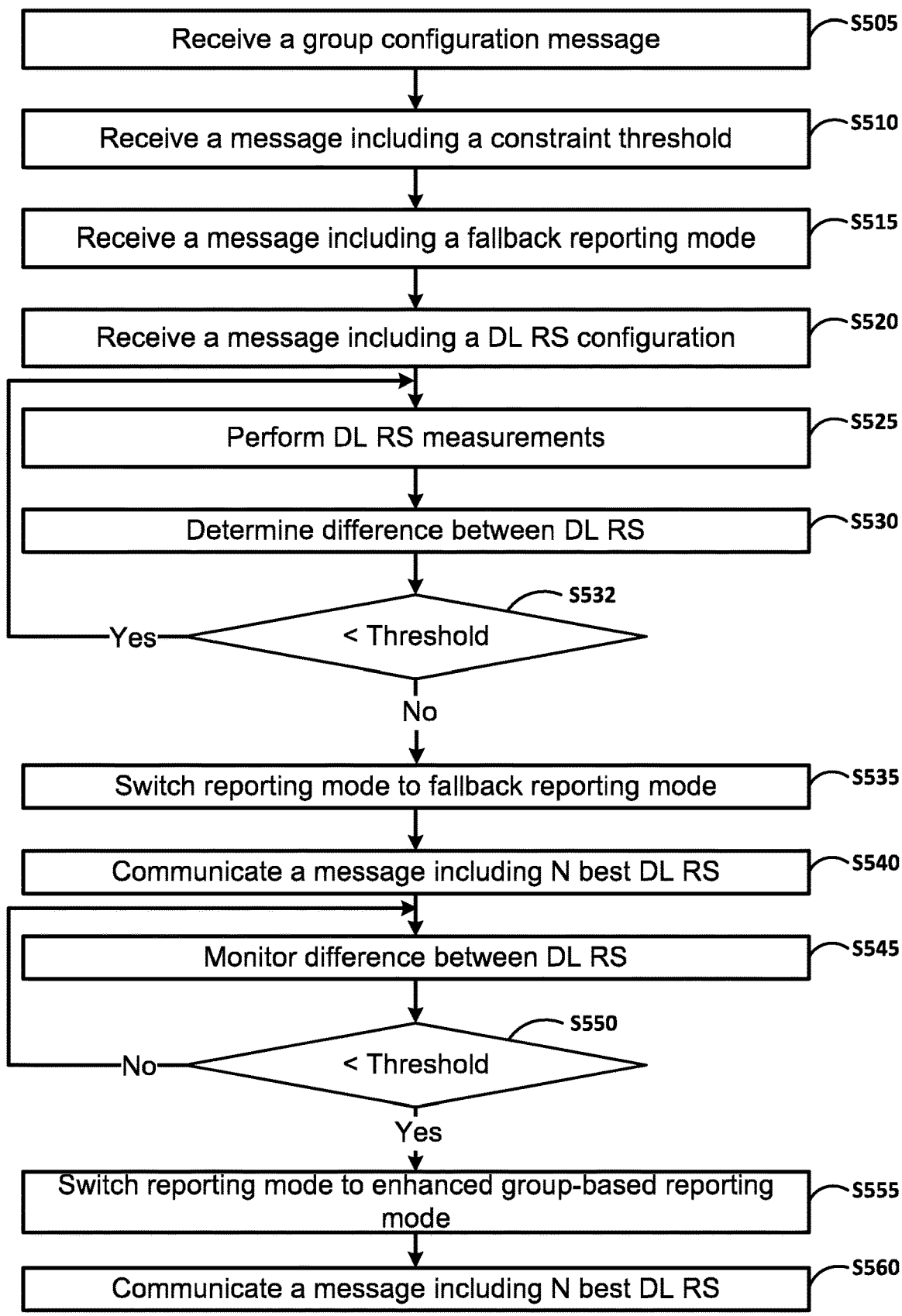
FIG. 5 illustrates a block diagram of a flow chart used by a user equipment (UE) in an enhanced reporting mode process according to at least one example embodiment.

FIG. 5 illustrates a block diagram of a method used by a UE in an enhanced reporting mode process according to at least one example embodiment. As shown in FIG. 5, in step S505 a group configuration message is received. For example, a message including group-based beam reporting configuration information can be received from a TRP (e.g., a gNB). The message can be received via a PDCCH or a PDSCH.

In step S510 a message including a constraint threshold is received. For example, a message including a constraint threshold can be received from the TRP. The enhanced group-based beam reporting may be established by defining new rules and/or constraints for the measurements and reporting as well as categorizing DL RS to different TRP(s). The constraint threshold can be a constraint for the measurements of DL RS. The measurement can be a RSRP measurement, a RSSI measurement, a SINR measurement, and/or the like. The constraint threshold can be associated with an RSRP (a RSSI, a SINR, and/or the like) difference between beams of at least one TRP. For example, the constraint threshold can be the difference between an RSRP measurement (e.g., an RSRP maximum) of a first TRP and an RSRP measurement (e.g., an RSRP maximum) of a second RSRP. The message can be received via a PDCCH or a PDSCH.

In step S515 a message including a fallback reporting mode is received. For example, a message indicating a fallback reporting mode as basic group-based beam reporting can be received from the TRP. The message can be received via a PDCCH or a PDSCH.

In step S520 a message including a DL RS configuration is received. For example, the message can be received from the TRP. The DL RS configuration message can include measurement information for DL RSs that may be identified with an identifier of the TRP. The identifier could be a logical identifier (e.g., gives network flexibility to separate e.g. different TX panels at the same TRP). The message can be received via a PDCCH or a PDSCH.

In step S525 DL RS measurements are performed. For example, the measurements can be made by the UE for each panel (antenna) associated with the UE. The measurements can include RSRP, RSSI, SINR, and/or the like measurements. The measurements can include TRP identification or identity information.

In step S530 a difference between DL RS is determined. For example, the difference can be computed by the UE. The difference between DL RS(s) can be a difference between the strongest RS resource (RSRP) of a first TRP and the strongest RS resource (RSRP) of at least one second TRP.

In step S532 if the DL RS difference is not less than a threshold, processing continues to step S535. Otherwise processing returns to step S525 where the measuring and determining of the difference between DL RS monitoring continues.

In step S535 a reporting mode is switched to the fallback reporting mode. For example, the UE switches its group-based beam reporting to the fallback (e.g., basic group-based) beam reporting mode (see FIG. 2B) for a single TRP (e.g., the TRP with the highest RSRP).

In step S540 a message including N best DL RS is communicated. For example, the message can be communicated from the UE to at least one TRP. The N best DL RS can be determined by the UE. The N best DL RS can be determined based on RSRP, RSSI, SINR, and/or the like. For example, the N best DL RS can be N DL RS having a minimum RSRP. The message can identification or identity information of the TRP associated with the DL RS. The message can be communicated using a PUCCH or a PUSCH.

In step S545 a difference between DL RS is monitored. For example, a RSRP difference for DL RS can be monitored. In step S550 if the DL RS difference is less than a threshold, processing continues to step S555. Otherwise processing returns to step S545 where the difference between DL RS monitoring continues. In an alternative implementation, processing for enhanced group-based beam reporting may be terminated.

In step S555 the reporting mode is switched to enhanced group based reporting. For example, the UE can use Multi-TRP transmission. Multi-TRP transmission for can include the UE acquiring resources from at least two TRPs. The at least two TRPs can be associated with the same cell. The at least two TRPs can be associated with a different cell. By switching the UE to enhanced group-based beam reporting, the UE can report DL RSs that the UE can receive from different TRPs using different RX panels at the UE. Therefore, the UE can change its RX beam and/or antenna panel without a prior communication with a TRP.

In step S560 a message including N best DL RS is communicated. For example, the message can be communicated from the UE to at least one TRP. The N best DL RS can be determined by the UE. The N best DL RS can be determined based on RSRP, RSSI, SINR, and/or the like. For example, the N best DL RS can be N DL RS having a minimum RSRP. The message can identification or identity information of the TRP associated with the DL RS. The message can be communicated using a PUCCH or a PUSCH.

SOME EXAMPLE ADVANTAGES

Figure 6:
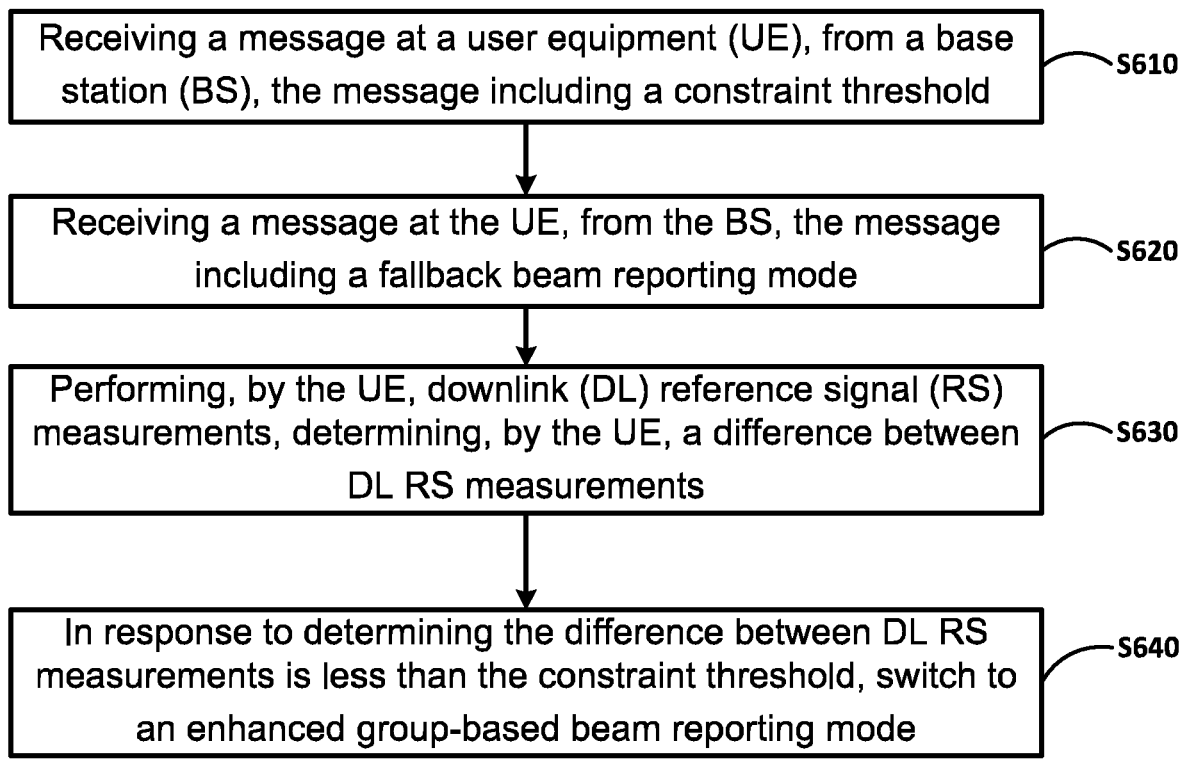
FIG. 6 is a flowchart illustrating operation of a user equipment according to at least one example embodiment.

Example 1. FIG. 6 is a flowchart illustrating operation of a user equipment. Operation S610 includes receiving a message at a user equipment (UE), from a base station (BS), the message including a constraint threshold. Operation S620 includes receiving a message at the UE, from the BS, the message including a fallback beam reporting mode. Operation S630 includes performing, by the UE, downlink (DL) reference signal (RS) measurements, determining, by the UE, a difference between DL RS measurements. Operation S640 includes, in response to determining the difference between DL RS measurements is less than the constraint threshold, switch to an enhanced group-based beam reporting mode.

Example 2. The method of Example 1, further including determining the N best DL RS based on at least one of the DL RS measurements and the difference between DL RS measurements and communicating a message including the N best DL RS from the UE to the BS.

Example 3. The method of Example 1 and Example 2, further including, in response to determining the difference between DL RS measurements is not less than the constraint threshold, monitor the difference between DL RS measurements.

Example 4. The method of Example 1 and Example 2, further including, in response to determining the difference between DL RS measurements is not less than the constraint threshold, terminate processing.

Example 5. The method of Example 1 to Example 4, further including, after switching to the fallback beam reporting mode, monitoring the difference between DL RS measurements, in response to determining the difference between DL RS measurements is less than the constraint threshold, switch to an enhanced group-based beam reporting mode, and monitor the difference between DL RS measurements.

Example 6. The method of Example 1 to Example 4, further including, after switching to the fallback beam reporting mode, monitoring the difference between DL RS measurements, in response to determining the difference between DL RS measurements is less than the constraint threshold, switch to an enhanced group-based beam reporting mode, and terminate processing.

Example 7. The method of Example 5 and Example 6, wherein the monitoring of the difference between DL RS measurements can be performed N times.

Example 8. The method of Example 5 and Example 6, wherein the monitoring of the difference between DL RS measurements can be performed N times in a time window.

Example 9. The method of Example 1 to Example 8, wherein the performing of the DL RS measurements and the determining of the difference between DL RS measurements can be performed N times before switching to the enhanced group-based beam reporting mode.

Example 10. The method of Example 1 to Example 8, wherein the performing of the DL RS measurements and the determining of the difference between DL RS measurements can be performed N times in a time window before switching to the enhanced group-based beam reporting mode.

Example 11. The method of Example 9 and Example 10, wherein the difference between DL RS measurements can be less than the constraint threshold N times.

Example 12. The method of Example 1 to Example 11, further including, before switching to the enhanced group-based beam reporting mode, switching to a basic beam group-based reporting mode.

Example 13. The method of Example 1 to Example 12, wherein the DL RS measurements a can be measurements of a reference signal received power (RSRP) of two or more transmission and reception points (TRPs).

Example 14. The method of Example 1 to Example 13, wherein the DL RS measurements can be measurements of a RSRP at different panels of the UE.

Example 15. The method of Example 1 to Example 14, wherein the DL RS measurements can be a measurement of a RSRP from a first TRP at a first panel of the UE and can be a measurement of a RSRP from a second TRP at a second panel of the UE.

Example 16. The method of Example 15, wherein the first TRP and the second TRP can be located in the same cell. The first TRP can be located in a first cell and the second TRP can be located in a second cell.

Example 17. The method of Example 1 to Example 16, further including performing a layer 1 handover between a first cell and a second cell.

Example 18. The method of Example 1 to Example 17, wherein the BS can include two or more TRPs.

Figure 7:
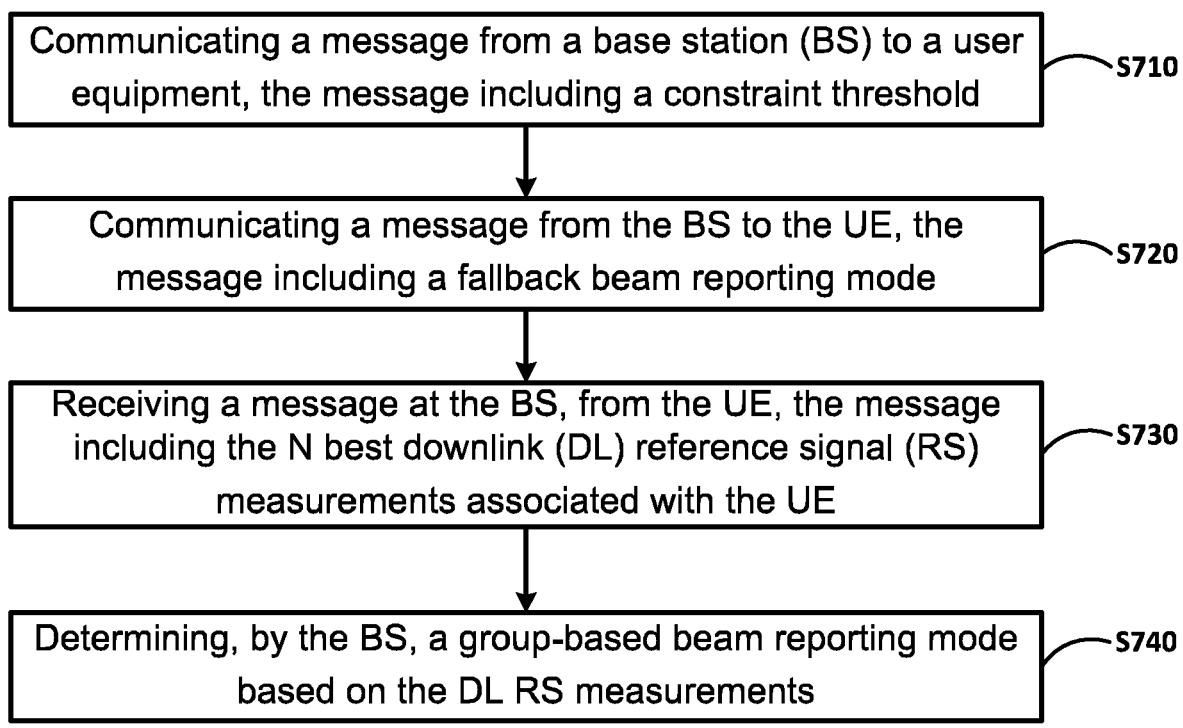
FIG. 7 is a flowchart illustrating operation of a base station according to at least one example embodiment.

Example 19. FIG. 7 is a flowchart illustrating operation of a base station. Operation S710 includes communicating a message from a base station (BS) to a user equipment, the message including a constraint threshold. Operation S720 includes communicating a message from the BS to the UE, the message including a fallback beam reporting mode. Operation S730 includes receiving a message at the BS, from the UE, the message including the N best downlink (DL) reference signal (RS) measurements associated with the UE. Operation S740 includes determining, by the BS, a group-based beam reporting mode based on the DL RS measurements.

Example 20. The method of Example 19, wherein the DL RS measurements can be measurements of a reference signal received power (RSRP) of two or more transmission and reception points (TRPs).

Example 21. The method of Example 19 and Example 20, wherein the DL RS measurements can be measurements of a RSRP at different panels of the UE.

Example 22. The method of Example 19 to Example 21, wherein the DL RS measurements can be a measurement of a RSRP from a first TRP at a first panel of the UE and are a measurement of a RSRP from a second TRP at a second panel of the UE.

Example 23. The method of Example 22, wherein the first TRP and the second TRP can be located in the same cell.

Example 24. The method of Example 22, wherein the first TRP can be located in a first cell and the second TRP can be located in a second cell.

Example 25. The method of Example 19 to Example 24, wherein the determined group-based beam reporting mode can be a group-based beam reporting mode.

Example 26. The method of Example 19 to Example 25, wherein the fallback beam reporting mode can be a basic group-based beam reporting mode.

Figure 8:
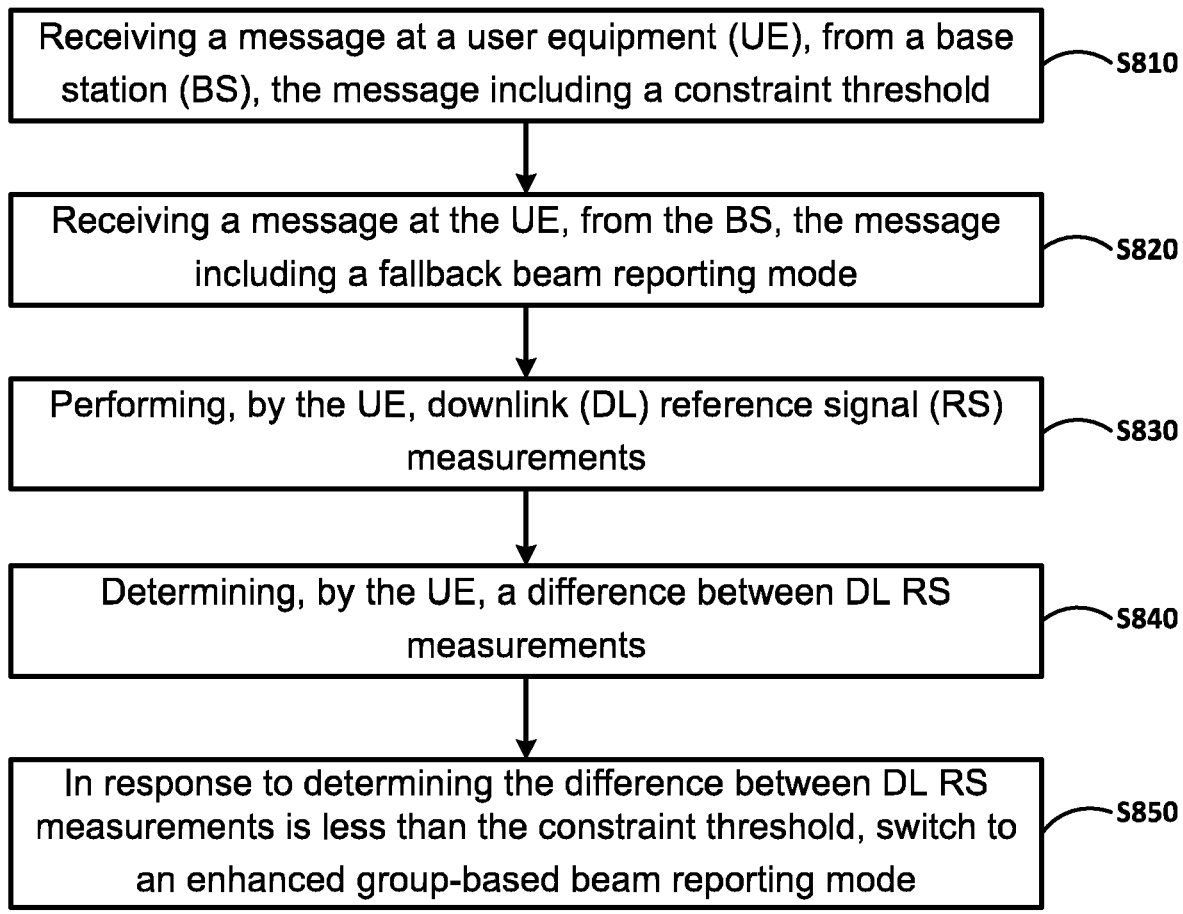
FIG. 8 is a flowchart illustrating operation of a user equipment according to at least one example embodiment.

Example 27. FIG. 8 is a flowchart illustrating operation of a user equipment. Operation S810 includes receiving a message at a user equipment (UE), from a base station (BS), the message including a constraint threshold. Operation S820 includes receiving a message at the UE, from the BS, the message including a fallback beam reporting mode. Operation S830 includes performing, by the UE, downlink (DL) reference signal (RS) measurements. Operation S840 includes determining, by the UE, a difference between DL RS measurements. Operation S850 includes, in response to determining the difference between DL RS measurements is less than the constraint threshold, switch to an enhanced group-based beam reporting mode.

Example 28. The method of Example 27, further including determining the N best DL RS based on at least one of the DL RS measurements and the difference between DL RS measurements and communicating a message including the N best DL RS from the UE to the BS.

Example 29. The method of Example 27 and Example 28, further including, in response to determining the difference between DL RS measurements is not less than the constraint threshold, monitor the difference between DL RS measurements.

Example 30. The method of Example 27 and Example 28, further including, in response to determining the difference between DL RS measurements is not less than the constraint threshold, terminate processing.

Example 31. The method of Example 27 to Example 30, further including before performing DL RS measurements, switching to the fallback beam reporting mode.

Example 32. The method of Example 27 to Example 31, wherein the performing of the DL RS measurements and the determining of the difference between DL RS measurements can be performed N times.

Example 33. The method of Example 27 to Example 31, wherein the performing of the DL RS measurements and the determining of the difference between DL RS measurements can be performed N times in a time window.

Example 34. The method of Example 27 to Example 33, wherein the difference between DL RS measurements can be less than the constraint threshold N times.

Example 35. The method of Example 27 to Example 34, wherein the DL RS measurements can be measurements of a reference signal received power (RSRP) of two or more transmission and reception points (TRPs).

Example 36. The method of Example 27 to Example 35, wherein the DL RS measurements can be measurements of a RSRP at different panels of the UE.

Example 37. The method of Example 27 to Example 36, wherein the DL RS measurements can be a measurement of a RSRP from a first TRP at a first panel of the UE and can be a measurement of a RSRP from a second TRP at a second panel of the UE.

Example 38. The method of Example 37, wherein the first TRP and the second TRP can be located in the same cell.

Example 39. The method of Example 37, wherein the first TRP can be located in a first cell and the second TRP can be located in a second cell.

Example 40. The method of Example 27 to Example 39, further including performing a layer 1 handover between a first cell and a second cell.

Example 41. The method of Example 27 to Example 40, wherein the BS can include two or more TRPs.

Example 42. A non-transitory computer-readable storage medium comprising instructions stored thereon that, when executed by at least one processor, are configured to cause a computing system to perform the method of any of Examples 1-41.

Example 43. An apparatus comprising means for performing the method of any of Examples 1-41.

Example 44. An apparatus comprising: at least one processor; and at least one memory including computer program code; the at least one memory and the computer program code configured to, with the at least one processor, cause the apparatus at least to perform the method of any of Examples 1-41.

Figure 9:
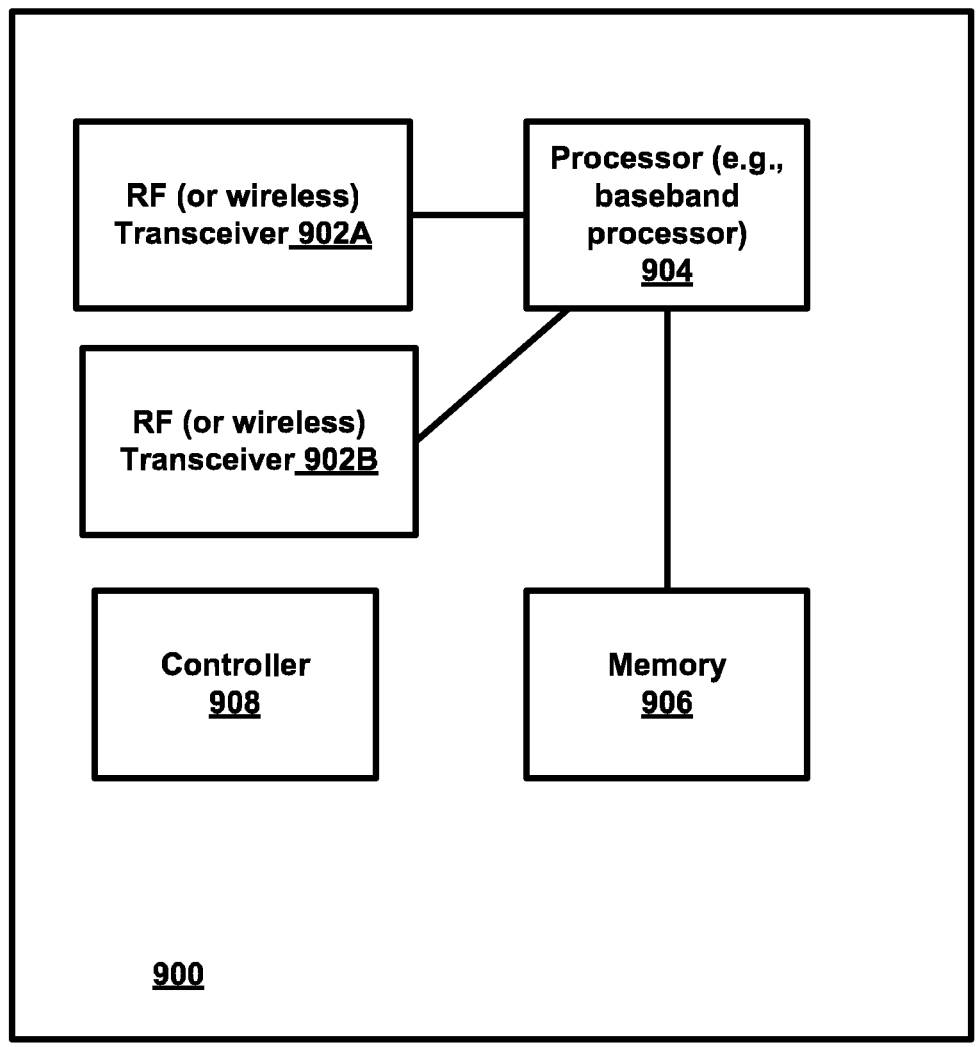
FIG. 9 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 9 is a block diagram of a wireless station 900 or wireless node or network node 900 according to an example embodiment. The wireless node or wireless station or network node 900 may include, e.g., one or more of an AP, BS, gNB, RAN node, relay node, UE or user device, network node, network entity, DU, CU-CP, CU-CP, . . . or other node) according to an example embodiment.

The wireless station 900 may include, for example, one or more (e.g., two as shown in FIG. 9) RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The example embodiments are not, however, restricted to the system that is given as an example, but a person skilled in the art may apply the solution to other communication systems. Another example of a suitable communications system is the system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   at least one processor; and
   at least one memory including computer program code;
   the at least one memory and the computer program code configured to, with the at least one processor, cause the apparatus at least to:
      receive a message at a user equipment (UE), from a base station (BS), the message including a constraint threshold;
      receive a message at the UE, from the BS, the message including a fallback beam reporting mode;
      perform, by the UE, downlink (DL) reference signal (RS) measurements;
      determine, by the UE, a difference between DL RS measurements; and
      in response to determining the difference between DL RS measurements is not less than the constraint threshold, switch to the fallback beam reporting mode.

2. The apparatus of claim 1, wherein the apparatus is further caused to:
   determine N best DL RS based on at least one of the DL RS measurements and the difference between DL RS measurements; and
   communicate a message including the N best DL RS from the UE to the BS.

3. The apparatus of claim 1, wherein the apparatus is further caused to:
   in response to determining the difference between DL RS measurements is less than the constraint threshold, monitor the difference between DL RS measurements.

4. The apparatus of claim 1, wherein the apparatus is further caused to:
   in response to determining the difference between DL RS measurements is less than the constraint threshold, terminate processing.

5. The apparatus of claim 1, wherein the apparatus is further caused to:
   after switching to the fallback beam reporting mode, monitor the difference between DL RS measurements;
   in response to determining the difference between DL RS measurements is less than the constraint threshold,
      switch to an enhanced group-based beam reporting mode, and
      monitor the difference between DL RS measurements.

6. The apparatus of claim 5, wherein the monitoring of the difference between DL RS measurements is performed N times.

7. The apparatus of claim 5, wherein the monitoring of the difference between DL RS measurements is performed N times in a time window.

8. The apparatus of claim 1, wherein the apparatus is further caused to:
   after switching to the fallback beam reporting mode, monitor the difference between DL RS measurements;
   in response to determining the difference between DL RS measurements is less than the constraint threshold,
      switch to an enhanced group-based beam reporting mode, and
      terminate processing.

9. The apparatus of claim 1, wherein the performing of the DL RS measurements and the determining of the difference between DL RS measurements is performed N times before switching to an enhanced group-based beam reporting mode.

10. The apparatus of claim 1, wherein the performing of the DL RS measurements and the determining of the difference between DL RS measurements is performed N times in a time window before switching to an enhanced group-based beam reporting mode.

11. The apparatus of claim 9, wherein the difference between DL RS measurements is determined less than the constraint threshold N times.

12. The apparatus of claim 1, wherein the apparatus is further caused to:
   before switching to the enhanced group-based beam reporting mode, switch to a basic beam group-based reporting mode.

13. The apparatus of claim 1, wherein the DL RS measurements are measurements of a reference signal received power (RSRP) of two or more transmission and reception points (TRPs).

14. The apparatus of claim 1, wherein the DL RS measurements are measurements of a RSRP at different panels of the UE.

15. The apparatus of claim 1, wherein the DL RS measurements are a measurement of a RSRP from a first TRP at a first panel of the UE and are a measurement of a RSRP from a second TRP at a second panel of the UE.

16. The apparatus of claim 15, wherein the first TRP and the second TRP are located in the same cell.

17. The apparatus of claim 15, wherein the first TRP is located in a first cell and the second TRP is located in a second cell.

18. The apparatus of claim 1, wherein the apparatus is further caused to:
   perform a layer 1 handover between a first cell and a second cell.

19. The apparatus of claim 1, wherein the BS includes two or more TRPs.

20. An apparatus comprising:
at least one processor; and
at least one memory including computer program code;
the at least one memory and the computer program code configured to, with the at least one processor, cause the apparatus at least to:
- communicate a message from a base station (BS) to a user equipment, the message including a constraint threshold;
- communicate a message from the BS to the UE, the message including a fallback beam reporting mode;
- receive a message at the BS, from the UE, the message including N best downlink (DL) reference signal (RS) measurements associated with the UE; and
- determine, by the BS, a group-based beam reporting mode based on the DL RS measurements.

* * * * *